Figure 1:
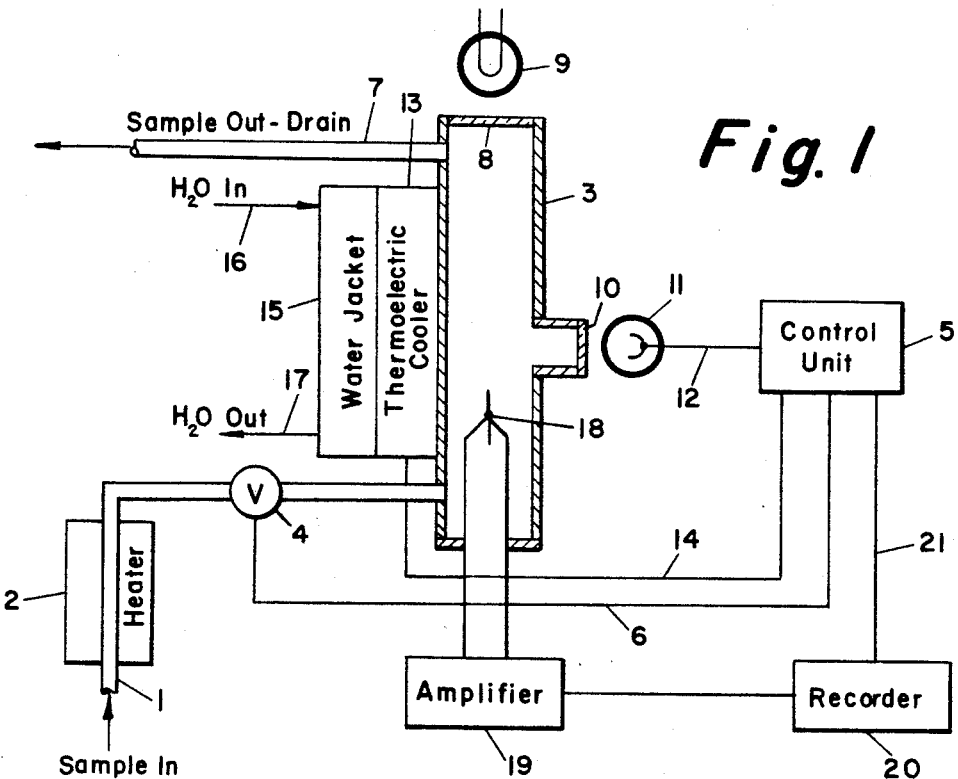

May 30, 1967　　　D. J. GENIESSE　　　3,322,960
HAZE POINT MEASURING SYSTEM WITH AUTOMATIC COOLING MEANS
Filed Feb. 18, 1963　　　　　　　　　　　2 Sheets-Sheet 1

INVENTOR.
DONALD J. GENIESSE
BY
George T. Church
ATTORNEY

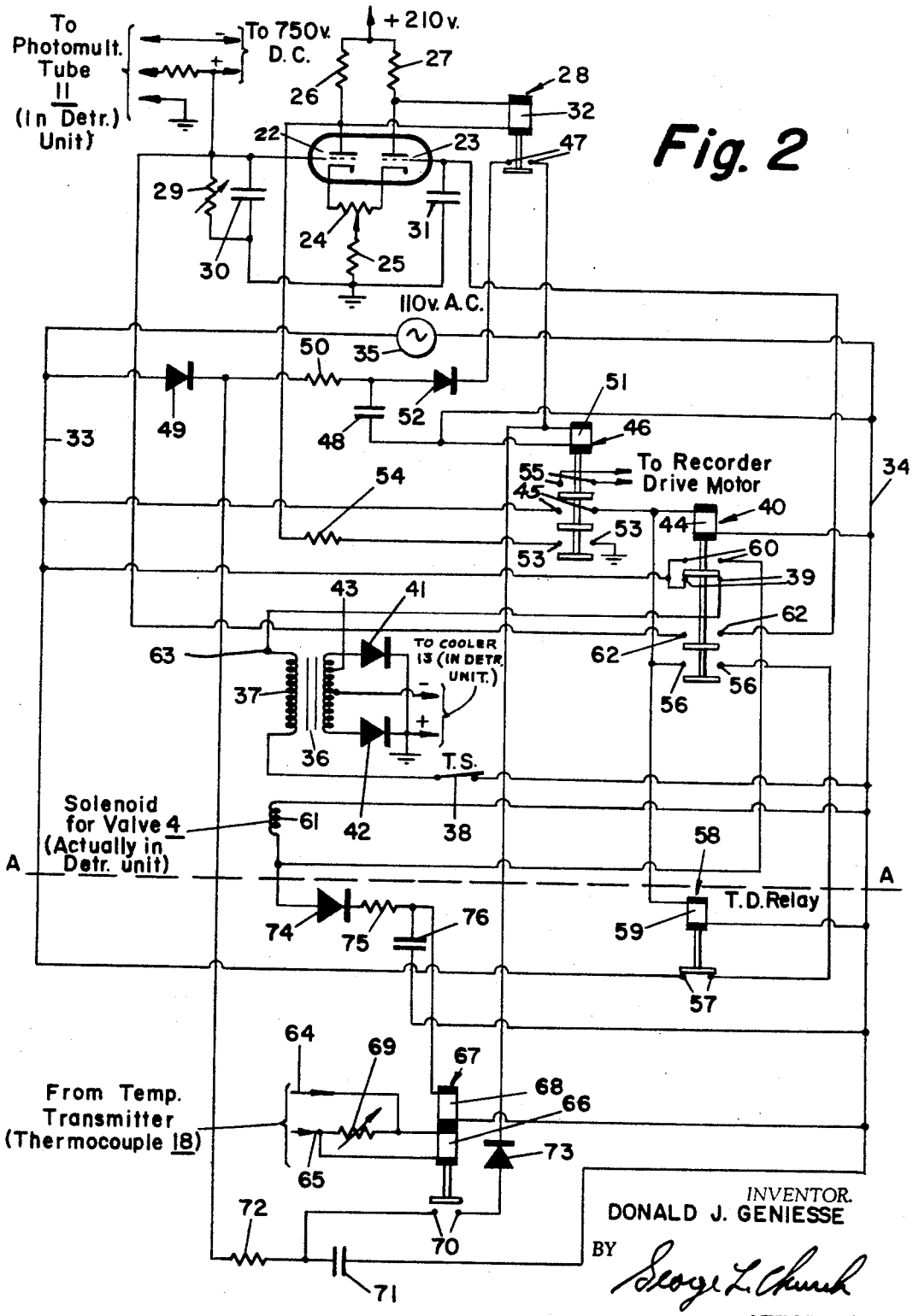

3,322,960
HAZE POINT MEASURING SYSTEM WITH AUTOMATIC COOLING MEANS
Donald J. Geniesse, West Chester, Pa., assignor to Sun Oil Company, Philadelphia, Pa., a corporation of Pennsylvania
Filed Feb. 18, 1963, Ser. No. 259,231
12 Claims. (Cl. 250—218)

This invention relates to an apparatus for analyzing a stream to automatically determine, in a cyclic and repetitive manner, the saturation temperature of a material dissolved in a fluid. Specifically, the apparatus may be referred to as a haze or cloud point detector, or a haze or cloud point analyzer.

For convenience, the apparatus will be described as a device for automatically determining the haze or cloud point of a liquid hydrocarbon stream. However, similar apparatus can be used to measure the saturation temperature or dew point (expressed as a temperature) of any material dissolved in a liquid, provided only that a cloud or haze that is detectable by a photosensitive device forms at that temperature. Also, the formation of crystals (in a liquid) due to a decrease in temperature can be detected. Likewise, the apparatus could be used to detect the dew points of gases.

The haze or cloud point of a liquid hydrocarbon is the temperature at which the water dissolved in the hydrocarbon begins to condense and form a visible cloud or haze. This temperature depends, for any particular liquid sample to be analyzed, on the amount of water dissolved in the sample, and the temperature varies in accordance with the relative amount of such dissolved water. The higher the proportion of water which is dissolved in the sample, the higher will be the haze or cloud point.

The specifications for certain hydrocarbon products, e.g. fuel oil, set forth a certain haze point. It is therefore rather important for the refinery operator to be apprised of the haze point of the stream of the product being produced, so that he can make control adjustments (if necessary) to keep the product "on specification." The present apparatus automatically determines this haze point (temperature), in a rapid, cyclic, and repetitive manner.

A brief description of the operation of the haze analyzer of the invention will now be given. Fluid containing a dissolved material (e.g., water) is fed through a heater (which heats the fluid to a temperature higher than any saturation temperature or haze point expected) into a vessel or cell, by way of a controllable valve. A lamp projects a beam of light into the interior of the vessel, and a photosensitive device (e.g., a photomultipler tube) is mounted out of the path of this beam, but in a position to pick up light scattered by or reflected from small particles in the fluid. A controllable cooling means is mounted adjacent the wall of the vessel, to cool the vessel (and the fluid therein) down to the saturation temperature of the dissolved material. A thermocouple in the vessel indicates the temperature of the fluid therein. Assuming that the vessel contains fluid and that the cooling means is active, when the saturation temperature of the material is reached a cloud or haze forms in the fluid, which changes the light picked up by the photosensitive device. This, through appropriate circuitry, causes the feed valve to open (to thereby feed a new heated sample into the vessel) and renders the cooling means ineffective. At a preset time thereafter, the feed valve is closed (to trap a new sample in the vessel) and the cooling means is again rendered effective, to automatically repeat the measurement by again cooling the fluid down to the saturation temperature of the dissolved material. This saturation temperature of the dissolved material, which is the haze or cloud point of the liquid sample, is detected by the thermocouple and is recorded.

Figure 3:
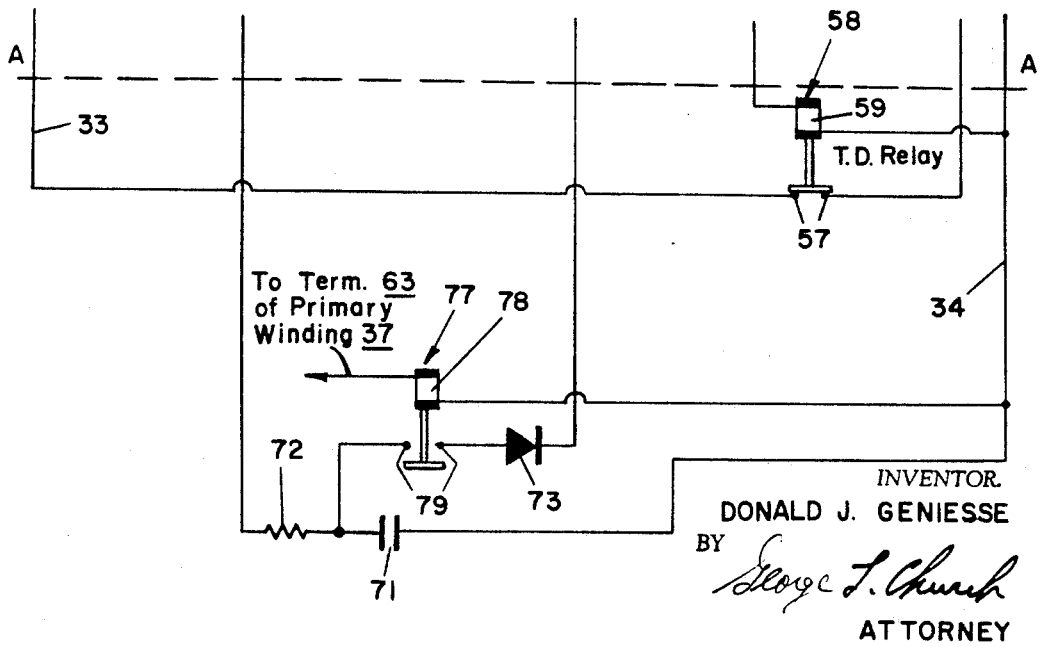

A detailed description of the invention follows, taken in conjunction with the accompanying drawings, wherein:

FIG. 1 is a schematic block diagram of a haze analyzer according to the invention;
FIG. 2 is a circuit schematic of a control unit; and
FIG. 3 is a schematic of a modification of a portion of the FIG. 2 circuit.

Referring first to FIG. 1, a fluid sample (e.g., a sample of a liquid hydrocarbon product such as furnace oil or kerosene) is fed through a pipe 1 toward the analyzer. By means of a heater schematically indicated at 2, the sample is heated to a temperature considerably higher than the highest haze point or cloud point expected. This heating is preferably done with steam, because the sample pipe 1 itself can be steam-traced and insulated, avoiding the sample time lag involved in using an electrically heated chamber. This heating ensures that the moisture entering a cell or vessel 3 will be in a dissolved state.

The sample flows from heater 2 toward cell 3 by way of a solenoid-operated on-off valve 4, which is opened and closed on signal from the control unit 5, by way of a connection 6. Assume first that valve 4 is open. This allows a heated sample of oil to enter the cell 3, near the bottom thereof. The sample can flow out of the cell 3 by way of a drain pipe 7 which is coupled to cell 3 near the top thereof.

The cell 3 is an upright metallic vessel having a cylindrical chamber therein which has a black oxide coating over its entire interior surface, to minimize light reflections. At its upper end, cell 3 is provided with a transparent window 8, and a lamp 9 is mounted outside of but adjacent this window so as to project a beam of light into the interior of the vessel. Lamp 9 is energized through a constant voltage transformer, to minimize changes in the intensity of the light due to line voltage variations. About midway of the length of the vessel 3, a transparent window 10 is sealed into the side wall thereof, and a phototube 11 (e.g., a photomultiplier tube) is mounted outside of but adjacent this window so as to pick up light from the interior of the vessel. The geometry is such that the direct rays of light are not "seen" by the light-sensitive device (phototube), but it can "see" scattered light in the interior of the vessel. Preferably, this photomultiplier tube is enclosed in a light-proof housing, to avoid the picking up of stray light from the outside. The signal from photomultiplier tube 11 is fed to control unit 5 by way of a connection 12.

A plurality of thermoelectric elements 13 are mounted on the outside of vessel 3, in intimate thermal contact with the wall of this vessel. These elements are energized from control unit 5 by way of a connection 14, and act as heat pumps. They are connected to pump heat away from the wall of vessel 3, thereby to cool this vessel. A water jacket 15 is mounted in intimate thermal contact with the outer faces of the thermoelectric elements 13, to remove the heat from the thermoelectric elements. Cooling water is circulated through jacket 15 by means of the couplings indicated at 16 and 17. When the analyzer is in operation, the heat from the oil (fluid sample, heated at 2) travels by conduction through the vessel or cell walls. When the elements making up the cooler 13 are energized, this heat is pumped thermoelectrically to the outer faces of the elements 13, and here removed by water flowing through the water jacket 15. A thermostatic switch (not shown in FIG. 1, but indicated at 38 in FIG. 2) is located on water jacket 15. If the water flow is not sufficient to remove the heat from the thermoelectric cooler 13, the temperature of jacket 15 will increase, opening the aforesaid thermostatic switch; this disconnects the primary winding of the transformer which supplies power to the thermoelectric cooler. The switch referred to is adjusted to open at approximately 125° F.

A thermocouple 18, for measuring the temperature of the fluid in vessel 3, is inserted into the bottom of this cell, this thermocouple being located just out of the field of view of phototube 11. The thermocouple output is fed through an amplifier 19 to a recorder 20, which latter records the temperature measured or sensed by thermocouple 18. Recorder 20 is controlled from control unit 5, by way of a connection 21.

It was previously stated that valve 4 is assumed to be open, so that the description of the operation may be carried forward. Valve 4 being open, a heated sample of oil enters cell 3, flows upwardly through the chamber, and leaves via drain pipe 7. This flow displaces the previously measured sample, and serves to warm the cell. The valve 4 closes after a predetermined interval of time; this interval is determined by the amount of time necessary to ensure heating of the interior of vessel 3 (by the heated sample) to a temperature greater than the haze point of the sample. As control unit 5 causes valve 4 to close, thereby trapping a sample in vessel 3, the control unit also turns on or energizes the thermoelectric cooler 13, and the sample cooling begins, by cooling of the cell walls.

When the oil sample reaches its haze point, the dissolved water begins to condense in the form of droplets, producing a visible cloud or haze. The light scattered by these water droplets is picked up by the photomultiplier tube 11. The resultant increase in signal from this tube actuates a relay in the control unit 5, energizing the rebalancing motor of the recorder 20 for a brief period. During this period, the temperature of the oil in the cell block (as measured by thermocouple 18) is recorded on the chart paper, as the haze point of the sample. Also, at this instant (i.e., when the relay is actuated) the cooler 13 is deenergized or turned off and the solenoid valve 4 is opened, allowing warmer oil to enter the cell block and displacing the colder oil. The valve remains open for a predetermined interval, and then the valve closes to repeat the measuring cycle, with a new sample. The time for a complete cycle is from one to five minutes, depending on the haze point.

Speaking generally, the analyzer of this invention, as employed in a practical device, comprises two units, a detector unit and a control unit. While in service for measuring the haze point of a liquid hydrocarbon, each of these units is covered with an explosion proof housing. The detector unit contains the measuring cell 3, the thermoelectric coolers 13 with water jackets 15, the photomultiplier tube 11, and the solenoid valve 4.

Now refer to FIG. 2, which is a circuit schematic of the principal portions of a control unit 5. A pair of triode electron discharge device elements 22 and 23, contained in a common evacuated envelope for example, are connected in a differential manner. The cathodes of elements 22 and 23 are connected to opposite ends of a balancing potentiometer 24, and the movable contact of this potentiometer is connected to ground through a resistor 25. The anode of element 22 is connected through a resistor 26 to a source of anode potential, and the anode of element 23 is connected through a resistor 27 to the same anode potential source. The common source for triode elements 22 and 23 may be a conventional 210-volt regulated power supply (not shown), which is one of the three power supplies contained in the control unit 5. A type 12AT7 vacuum tube may be used for elements 22, 23.

The anodes of triode elements 22 and 23 are connected to respective opposite ends of the operating winding 32 of a relay 28. Thus, when the difference in the anode voltages of triodes 22 and 23 exceeds a certain value, say four volts, relay 28 will be energized. This relay is illustrated in its unenergized position.

Another power supply contained in the control unit (but which is also not shown in detail, since it is of more or less conventional design) is a 750-volt power supply which provides the potential to operate the photomultiplier tube 11, in the detector unit. The connections for operating the photomultiplier tube are indicated at 12 in FIG. 1. The 750-volt supply is filtered, and is regulated by five type OA2 tubes connected in series. The positive side of this power supply is grounded to the chassis through a gain potentiometer 29, which may be a one megohm potentiometer. Potentiometer 29, which is connected in the grid circuit of triode 22, is also the load resistor for the photomultiplier tube. A rather large capacitor 30 (three microfarads, for example) is connected across potentiometer 29, that is, from the grid of triode 22 to ground. A similar large capacitor 31 is connected from the grid of triode 23 to ground.

The third power supply contained in the control unit produces 2.5 volts at 25 amperes to operate the thermoelectric coolers 13 in the detector unit. The connections for operating the coolers are indicated at 14 in FIG. 1. Two alternating current power buses 33 and 34 are utilized, connected to respective opposite sides of a commercial alternating current power line, indicated symbolically as a generator 35 in FIG. 2. The thermoelectric power supply includes a transformer 36 whose primary winding 37 is connected across the buses 33 and 34. One end terminal of winding 37 is connected through a thermostatic switch 38 to the bus 34. Switch 38 is the thermostatic switch (previously referred to) which is located on water jacket 15 of FIG. 1 and which performs a protective or safety function by preventing overheating of the water jacket; this switch is always closed during normal operation of the analyzer, and it is so illustrated in FIG. 2.

The other end terminal 63 of winding 37 is connected through the normally closed contacts 39 (i.e., closed when the relay is in the unenergized position illustrated) of a relay 40, to power bus 33. The thermoelectric power supply is rectified, but unfiltered and unregulated. Thus, rectifiers 41 and 42 are connected to opposite ends of the secondary winding 43 of transformer 36, and the positive output terminal of this power supply is grounded to the chassis, as indicated. The connections to power the thermoelectric cooler 13 are taken from ground and from a midtap on secondary winding 43.

The operating winding 44 of relay 40 is connected across the buses 33 and 34 through the normally open contacts 45 (i.e., open when the relay is in the unenergized position illustrated) of a relay 46.

During the cooling portion of the cycle (i.e., when cooler 13 is energized), relays 28, 46, and 40 are all unenergized, these relays then having the positions illustrated in FIG. 2. As the moisture haze or cloud forms in the cell 3 of FIG. 1, there is an increase in the scattered light "seen" by the phototube 11. This causes more current to pass through the grid resistor 29 (which is the phototube load resistor), increasing the voltage and making the grid of triode 22 more positive. This will cause the anode voltage of triode 22 to decrease. The anode voltage of triode 23 remains the same, since the grid voltage of this triode is held constant by the charge on capacitor 31. How this latter capacitor is periodically charged will be described hereinafter.

When the difference in the anode voltages of triodes 22 and 23 exceeds four volts, relay 28 is energized, closing its normally open contacts 47.

A capacitor 48 is connected to be charged from the alternating current source, through a rectifier 49 and a resistor 50. When contacts 47 of relay 28 close, this capacitor discharges through the operating winding 51 of relay 46, by way of a rectifier 52 and these contacts. This energizes relay 46 for approximately ½ second. The normally open contacts 53 of relay 46 then close, grounding the anode of triode 22 through a resistor 54; this holds relay 28 in the energized position as long as relay 46 is energized.

One phase of the two phase rebalancing motor on the recorder 20 (FIG. 1) is connected in series with the normally open contacts 55 of relay 46, so that the closing of these contacts will cause the motor to operate. Thus, when relay 46 is energized to close its contacts 55, the recorder rebalancing motor is energized, thereby to record the temperature measured or sensed by thermocouple 18 (FIG. 1).

When relay 46 is energized, its normally open contacts 45 close, energizing relay 40 from the buses 33 and 34 through an obvious circuit. Relay 40, energized momentarily by relay 46, is held in the energized position by the closure of its normally open holding contacts 56. This holding circuit can be traced as follows: bus 34, winding 44 of relay 40, contacts 56 (now closed), the normally closed contacts 57 of a time delay relay 58, but 33. The time delay relay 58 may, for example, be a "Haydon Delay Timer," having a timing motor illustrated as a winding 59 which is energized in parallel with the winding 44 of relay 40. The timer 58 functions to open its contacts 57 at the end of a predetermined time interval (e.g., 57 seconds) which begins with the energization of its winding 59. This will be further referred to hereinafter.

When relay 40 is energized, its normally closed contacts 39 open, opening the circuit to the primary 37 of the transformer 36 and deenergizing the thermoelectric cooler 13 (FIG. 1).

The closing of the normally open contacts 60 of relay 40 energizes the solenoid 61 of valve 4, through an obvious circuit. Solenoid 61 is actually located in the detector unit of FIG. 1, adjacent valve 4, but it is shown in the control unit of FIG. 2 for convenience. The energization of the solenoid valve 4 (see FIG. 1) opens this valve, allowing warm oil to pass through the cell 3.

When relay 40 is energized, its normally open contacts 62 close. This connects the upper side of capacitor 30 directly to the upper side of capacitor 31. In other words, this shorts together the grids of triodes 22 and 23, allowing capacitor 31 to charge to the same potential as capacitor 30. This provides the grid of triode 23 with a reference or threshold voltage before each measurement takes place, minimizing the effects of changes due to background light pickup (by the phototube 11) and aging characteristics of the lamp 9 and the photomultiplier tube 11.

When the preset time delay of the relay 58 is completed, its normally closed contacts 57 open, removing the holding potential from winding 44 and deenergizing relay 40. In this connection, it is pointed out that relay 46 will have released or become deenergized (thereby opening its contacts 45) long before the end of the time delay of relay or timer 58; relay 46 is initially energized by the discharge of capacitor 48, and this discharge requires only about ½ second.

When relay 40 is deenergized or released, the closing of its contacts 39 reapplies potential to the thermoelectric power supply (by closure of the circuit to the primary winding 37), thus reenergizing the thermoelectric coolers 13 (FIG. 1). The opening of relay contacts 60 deenergizes solenoid 61, closing valve 4 (FIG. 1).

The opening of relay contacts 62 removes the short-circuit between the grids of triodes 22 and 23. The reference grid (grid of triode 23) remains at the reference potential (established by the charge on capacitor 31), and the signal grid (grid of triode 22) voltage will increase as the reflected light (in cell 3, in FIG. 1) increases. A new measuring cycle (that is, the cooling portion of the overall cycle), with a new sample, has now begun.

If a sample has no haze point, that is, if it has essentially no dissolved water, the analyzer would continue to cool the sample indefinitely, since in this case the relay 40 would remain deenergized and its contacts 39 closed.

Such prolonged cooling of the sample is undesirable. To avoid such undesired functioning, two different types of automatic reset may be employed, depending on the analyzer application. These types may be referred to as: (1) low temperature reset, illustrated in FIG. 2; (2) time delay reset, illustrated in FIG. 3.

First refer to FIG. 2, which illustrates a low temperature reset. This type of reset is used where the temperature signal is transmitted as a unidirectional current. The current from the temperature transmitter (associated with thermocouple 18, FIG. 1) passes by way of leads 64 and 65 through one operating winding 66 of a two-winding relay 67. Relay 67 has another operating winding 68, and this relay is operated when either winding 66 or winding 68 is supplied with sufficient current. A potentiometer 69 in parallel with winding 66 is adjusted so that as the temperature in the cell 3 (FIG. 1) reaches a point lower than the lowest expected haze point, the current through winding 66 will be less than that required to hold relay 67 energized, and its contacts 70 open. Relay 67 is illustrated in the energized position (since that is its normal position), with contacts 70 open.

A capacitor 71 is connected to be charged from the alternating current source, through rectifier 49 and a resistor 72. If the temperature in the cell (as sensed by thermocouple 18) reaches a point lower than the lowest expected haze point, relay 67 releases, and contacts 70 close. When these contacts close or make, capacitor 71 discharges through the winding 51 of relay 46, by way of a rectifier 73 and these contacts. This energizes relay 46, initiating the read-out cycle and opening the solenoid valve (by energization of relay 40, just as in a normal measuring cycle).

When the valve solenoid 61 is energized, a branch circuit is established through a rectifier 74 and a resistor 75 for energization of winding 68 of relay 67. A capacitor 76 is connected across winding 68. Relay 67 is returned to its original energized position (wherein contacts 70 are open) by applying a unidirectional potential to winding 68, through the branch circuit just described. Winding 68 will keep relay 67 energized until the cooling process begins, since the unidirectional potential will be applied to this winding as long as valve solenoid 61 is energized. By the time the cooling process begins, the winding 66 will be re-energized (thereby to keep contacts 70 open) because the temperature in the cell has increased, increasing the current through this winding.

Now refer to FIG. 3, which illustrates a time delay reset. FIG. 3 is a modification of that portion of the FIG. 2 circuit which lies below line A—A. Note the corresponding line A—A in FIG. 3. The time delay type of reset (illustrated in FIG. 3) is used where the temperature signal is transmitted over thermocouple lead wire.

In FIG. 3, an additional time delay relay 77 (e.g., a "Haydon Delay Timer" similar to timer 58 in FIG. 2, but having a much longer time interval or delay period, such as 4.5 minutes) has a timing motor illustrated as a winding 78. Timer or relay 77 has a pair of normally open contacts 79 which are caused to close about 4.5 minutes after winding 78 is first energized, if this winding remains energized for that long a time. Winding 78 of relay 77 is connected in a branch circuit extending from the upper end terminal 63 of the primary 37 of thermoelectric supply transformer 36 to bus 34. Thus, winding 78 is energized essentially in parallel with the thermoelectric supply transformer, that is, it is energized when relay contacts 39 of relay 40 (FIG. 2) are closed. In FIG. 3, capacitor 71 is charged in the same manner as in FIG. 2, and can be discharged through the winding 51 of relay 46, by way of a rectifier 73, when relay contacts 79 close.

In FIG. 3, if the thermoelectric cooler remains energized for longer than 4.5 minutes, the relay 77 operates to close its contacts 79. It will be recalled here that winding 78 of relay 77 is energized when the thermoelectric cooler is energized. If contacts 79 close, capacitor 71 is discharged through the winding 51 of relay 46, initiating the measuring cycle (similarly to a normal measuring cycle). Thus, in FIG. 3, if the haze point has not been reached in 4.5 minutes of cooling, for any reason, a new sample is admitted to the cell and measured.

The invention claimed is:

1. Apparatus for determining the saturation temperature of a material dissolved in a fluid, comprising a vessel, means including a controllable valve for supplying a fluid containing dissolved material to said vessel, the fluid supplied being at a temperature higher than any saturation temperature expected; means for cooling said vesesl to thereby also cool the fluid therein, said cooling means being constructed and arranged for automatic enabling and disabling thereof; means for indicating the temperature of the fluid in said vessel, means acting automatically upon the lape of a preset, constant time interval which begins with the occurrence of a certain condition, to cause closing of said valve and to enable said cooling means, and means acting automatically in response to the reaching by the dissloved material of its saturation temperature to cause opening of said valve and to disable said cooling means, the said reaching of saturation temperature establishing said certain condition.

2. Apparatus as defined in claim 1, wherein the last-mentioned means acts in response to the formation of a haze in said fluid.

3. Apparatus as defined in claim 1, wherein the last-mentioned means includes means for projecting a beam of light into said vessel, and means for detecting a reflection of the light resulting from the formation of a haze in said fluid.

4. Apparatus as defined in claim 1, wherein said vessel cooling means comprises a thermoelectric device which is enabled and disabled by means of electrical energization and deenergization thereof.

5. Apparatus for determining the haze point of a fluid, comprising a vessel, means for supplying to said vessel a fluid at a temperature higher than any haze point expected, means for projecting a beam of light into said vessel, a phototube positioned out of the path of said beam but so located as to pick up light reflected from small particles in said fluid, means for cooling said vessel to thereby also cool the fluid therein, the cooling of the fluid to its haze point causing the condensation in said vessel of small particles of moisture, thereby to change the light picked up by said phototube, said cooling means being constructed and arranged for automatic enabling and disabling thereof; means automatically responsive to a change in the light picked up by said phototube for disabling said cooling means, and means for indicating the temperature of the fluid in said vessel.

6. Apparatus as defined in claim 5, wherein said vessel cooling means comprises a thermoelectric device which is enabled and disabled by means of electrical energization and deenergization thereof.

7. Apparatus for determining the haze point of a fluid, comprising a vessel, means including a controllable valve for supplying to said vessel a fluid at a temperature higher than any haze point expected, means for projecting a beam of light into said vessel, a phototube positioned out of the path of said beam but so located as to pick up light reflected from small particles in said fluid, means for cooling said vessel to thereby also cool the fluid therein, the cooling of the fluid to its haze point causing the condensation in said vessel of small particles of moisture, thereby to change the light picked up by said phototube, said cooling means being constructed and arranged for automatic enabling and disabling thereof; means automatically responsive to a change in the light picked up by said phototube for causing opening of said valve and for disabling said cooling means, and means for indicating the temperature of the fluid in said vessel.

8. Apparatus as defined in claim 7, wherein said vessel cooling means comprises a thermoelectric device which is enabled and disabled by means of electrical energization and deenergization thereof.

9. Apparatus for determining the haze point of a fluid, comprising a vessel, means including a controllable valve for supplying to said vessel a fluid at a temperature higher than any haze point expected, means for projecting a beam of light into said vessel, a phototube positioned out of the path of said beam but so located as to pick up light reflected from small particles in said fluid, means for cooling said vessel to thereby also cool the fluid therein, the cooling of the fluid to its haze point causing the condensation in said vessel of small particles of moisture, thereby to change the light picked up by said phototube, said cooling means being constructed and arranged for automatic enabling and disabling thereof; means automatically responsive to a change in the light picked up by said phototube for causing opening of said valve and for disabling said cooling means, means acting, upon the lapse of a preset, constant time interval which begins with the disabling of said cooling means, to cause closing of said valve and to enable said cooling means, and means for indicating the temperature of the fluid in said vessel.

10. Apparatus as defined in claim 9, wherein said vessel cooling means comprises a thermoelectric device which is enabled and disabled by means of electrical energization and deenergization thereof.

11. Apparatus as set forth in claim 5, including also means acting automatically, upon the lapse of a preset, constant time interval which begins with the disabling of said cooling means, to enable said cooling means.

12. Apparatus as set forth in claim 7, including also means acting automatically, upon the lapse of a preset, constant time interval which begins with the disabling of said cooling means, to enable said cooling means.

References Cited

UNITED STATES PATENTS

| | | | |
|---|---|---|---|
| 2,090,915 | 8/1937 | Powell et al. | 250—218 X |
| 2,307,292 | 1/1943 | Palmer | 250—218 X |
| 2,682,613 | 6/1954 | Uhl | 250—218 |
| 2,876,364 | 3/1959 | Goody | 88—14 |
| 3,011,390 | 12/1961 | Van Luik | 250—218 X |
| 3,060,318 | 10/1962 | Ouurard | 250—218 |
| 3,064,135 | 11/1962 | Roetter et al. | 250—218 |

RALPH G. NILSON, *Primary Examiner.*

ARCHIE R. BORCHELT, *Examiner.*

E. STRICKLAND, M. ABRAMSON,
*Assistant Examiners.*